US012139388B1

(12) United States Patent
Zhang et al.

(10) Patent No.: US 12,139,388 B1
(45) Date of Patent: Nov. 12, 2024

(54) ICE-MAKING MECHANISM AND WATER DISPENSER

(71) Applicant: NINGBO AQUART ELECTRICAL APPLIANCE CO., LTD, Zhejiang (CN)

(72) Inventors: Chunyun Zhang, Zhejiang (CN); Jinlong Pan, Zhejiang (CN); Shenggui Long, Zhejiang (CN); Zhaoxi Feng, Zhejiang (CN)

(73) Assignee: NINGBO AQUART ELECTRICAL APPLIANCE CO., LTD, Zhejiang (CN)

(*) Notice: Subject to any disclaimer, the term of this patent is extended or adjusted under 35 U.S.C. 154(b) by 0 days.

(21) Appl. No.: 18/660,432

(22) Filed: May 10, 2024

(30) Foreign Application Priority Data

Feb. 23, 2024 (CN) ........................ 202410204008.3

(51) Int. Cl.
*B67D 1/08* (2006.01)
*F25C 1/12* (2006.01)
*F25C 1/25* (2018.01)

(52) U.S. Cl.
CPC .............. *B67D 1/0859* (2013.01); *F25C 1/12* (2013.01); *F25C 1/25* (2018.01); *F25C 2400/14* (2013.01)

(58) Field of Classification Search
CPC .. F25C 5/24; F25C 1/147; F25C 5/142; F25C 2400/14; F25C 1/12; F25C 1/25; B67D 1/0859
See application file for complete search history.

(56) References Cited

U.S. PATENT DOCUMENTS 4,741,173 A * 5/1988 Neumann ............... F25C 1/147 62/298
2018/0080698 A1* 3/2018 Tarr ........................ F25C 1/147

FOREIGN PATENT DOCUMENTS

CN 206771831 U 12/2017
CN 210532768 U 5/2020
CN 114294872 A 4/2022
CN 114608233 A 6/2022
CN 217844386 U 11/2022
CN 115468346 A 12/2022
JP H08178494 * 7/1996 ................ F25C 5/00
JP 2010139197 A * 6/2010 ................ F25C 1/14

(Continued)

OTHER PUBLICATIONS

English language translation of JP2011043324 (Year: 2011).*

(Continued)

*Primary Examiner* — Cassey D Bauer
(74) *Attorney, Agent, or Firm* — Cooper Legal Group, LLC

(57) ABSTRACT

An ice-making mechanism and a water dispenser with the mechanism include an ice-making box configured to make ice cubes, the ice-making box is in communication with a water source, so that the water source supplies water to the ice-making box, an evaporator sleeved on the ice-making box, the evaporator is configured to cool the water in the ice-making box to make the ice cubes, an ice storage basket configured for storing the ice cubes, the ice storage basket is located on a side of the ice-making box away from the ground and is in communication with the ice-making box, and a cold water tank configured for storing cold water, the cold water tank is in communication with the ice storage basket.

11 Claims, 8 Drawing Sheets

(56) References Cited

FOREIGN PATENT DOCUMENTS

| | | | | | |
|---|---|---|---|---|---|
| JP | 2011043324 | A | * | 3/2011 | ................ F25C 5/18 |
| KR | 200471371 | Y1 | | 2/2014 | |

OTHER PUBLICATIONS

English language translation of JPH08178494 (Year: 1996).*
English language translation of JP2010139197 to Sanuki et al. (Year: 2010).*
Office Action received in corresponding Chinese patent application No. 202410204008.3, dated Sep. 6, 2024, 18 pages.

* cited by examiner

ICE-MAKING MECHANISM AND WATER DISPENSER

CROSS-REFERENCE TO RELATED APPLICATION

This application claims the priority and benefit of Chinese patent application serial no. 202410204008.3, filed on Feb. 23, 2024. The entirety of Chinese patent application serial no. 202410204008.3 is hereby incorporated by reference herein and made a part of this specification.

TECHNICAL FIELD

The disclosure relates to the field of water dispenser production, and in particular, to a mechanism for making ice and cold water and a water dispenser with this mechanism.

STATE OF THE ART

A water dispenser is a device that heats or cools bottled pure water (or mineral water) to make it convenient for people to drink. The bottled water is put on top of the water dispenser, which are used together.

In the existing technologies, an ice-making module of an ice-making water dispenser is proposed, which includes a machine body, an inner container, a partition and an ice-making box assembly. The partition is arranged in the inner container and divides the inner container into an ice receiving chamber and a water storage chamber which are arranged vertically from top to bottom. The partition is configured with water passage holes. The ice-making box assembly is installed in the ice receiving chamber of the inner container. The ice-making box assembly is configured to make ice cubes from water and rotate around an axis to be poured onto the partition. The meltwater flows into the water storage chamber through the water passage holes.

With respect to the above-mentioned existing technologies, the inventors found the following defects: the iced water in the water storage chamber is obtained by melting the ice cubes on the partition. The process, by which the water condenses into ice and then melts into water, will lead to a lot of resource wastes.

SUMMARY

In order to save resources and reduce resource wastes, the disclosure provides a mechanism for making ice and cold water and a water dispenser with the mechanism.

In the first aspect, the disclosure provides a mechanism for making ice and cold water, including:

- an ice-making box configured to make ice cubes, the ice-making box is in communication with a water source, so that the water source supplies water to the ice-making box,
- an evaporator sleeved on the ice-making box, the evaporator is configured to cool the water in the ice-making box to make the ice cubes,
- an ice storage basket configured for storing the ice cubes, the ice storage basket is located on a side of the ice-making box away from the ground and is in communication with the ice-making box, and
- a cold water tank configured for storing cold water, the cold water tank is in communication with the ice storage basket.

When cold water is needed, water from the water source enters the ice-making box, and after being cooled by the evaporator, enters the ice storage basket and flows into the cold water tank, so as to realize the preparation of the cold water while saving resources and reducing the resource wastes.

Optionally, a bottom of the ice storage basket is configured with a passageway in communication with the ice-making box, a partition is provided in the ice storage basket, and the passageway passes through the partition, the partition divides the ice storage basket into a cold water chamber and an ice storage chamber, the partition is configured with a through hole, iced water flows into the cold water chamber through the through hole, a size of the through hole is smaller than a size of any one of the ice cubes, the cold water chamber is in communication with the cold water tank, and the ice storage chamber is in communication with an ice outlet of the ice-making box.

The partition divides the ice storage basket into two chambers, namely the cold water chamber and the ice storage chamber. When cold water needs to be prepared, water at room temperature enters the ice-making box and is cooled by the evaporator. After cooling for a certain period of time, the cold water is transported to the passageway through the ice-making box and enters the cold water chamber along the through hole. Then the cold water is transported from the cold water chamber to the cold water tank. When ice cubes need to be prepared, water at room temperature enters the ice-making box and is cooled down to form ice cubes. The ice cubes are then transported to the passageway through the ice-making box. Since the size of the through hole is smaller than the size of the ice cube, the ice cube continues to be transported upward into the ice storage chamber, which reduces the probability of contact between the ice cubes and cold water, so that it less likely for the ice cubes to stick together.

According to the present disclosure, the passage facilitates the iced water generated by melting ice in the ice storage chamber to enter the cold water chamber, so as to improve the utilization rate of water and reduce the solidification probability of ice cubes in the ice storage chamber.

According to the present disclosure, the inclined top surface of the partition allows the cold water generated when part of the ice melts to quickly enter the side gap along the partition, so that the cold water and ice cubes are quickly separated, to reduce the contact time between the cold water and ice cubes.

With the position plate and the position socket, the positioning of the ice storage basket during installation is realized, which improves the convenience of installation of the ice storage basket.

According to the present disclosure, the cold water tank is arranged in the circumferential direction of the evaporator, which saves the space occupied by the mechanism for making ice and cold waters on the one hand, and can support the ice storage basket on the other hand, to improve the stability of the ice storage basket.

According to the present disclosure, the cold water chamber and the cold water tank are in communication with each other through the cold water delivery pipe. When the ice-making box works for preparing cold water, the cold water is delivered along the passageway, the through hole, the cold water chamber, the cold water delivery pipe, and finally to the cold water tank. The production of cold water and ice cubes is achieved through only one evaporator, which improves the utilization rate of the internal space and stores more cold water in the same volume.

Through the corresponding arrangement of the passage and the cold water delivery pipe of the present disclosure, the cold water generated by the melting ice cubes in the ice storage chamber can be delivered from the passage to the cold water delivery pipe in time, so as to improve the delivery efficiency.

In the second aspect, the disclosure provides a water dispenser, including the above-mentioned mechanism for making ice and cold water, a pusher dog configured for pushing ice cubes is rotatably provided in the ice storage basket, the ice storage basket is configured with an ice outlet on a side away from the passage, and the ice storage basket is provided with a door body configured for covering the ice outlet and an opening and closing mechanism configured for controlling open and close of the door body.

The pusher dog allows the force, with which the ice cubes are transported upward, to be applied to the pusher dog when ice cubes are generated in the ice-making box and transported to the ice storage chamber. The pusher dog is driven to rotate circumferentially, so that the stationary ice cubes in the ice storage basket are stirred and output from the ice outlet with the pusher dog. The opening and closing mechanism can control the output of ice cubes according to usage requirements. The water dispenser of the present disclosure has the advantage of reducing resource wastes.

According to the present disclosure, a clearance is provided, so that the fingers of the pusher dog is not intended to abut against the bottom wall of the ice storage chamber when it rotates, so as to ensure the smooth rotation of the pusher dog. The limit bar can block the ice cubes pushed by the pusher dog to a certain extent, which facilitates the output of the ice cubes from the ice outlet.

The present disclosure discloses the structure of a rotary assembly and a limit assembly. The rotary assembly can control the covering of the door body on the ice outlet, and the limit assembly can limit the rotary assembly, to reduce the probability of accidental opening due to the pressure on the door body by the ice cubes.

According to the present disclosure, the door body, the rotary assembly and the limit assembly are connected to the ice storage basket through the bracket, which reduces the number of holes punched on the ice storage basket, and thus reduces the number of seals for the holes on the ice storage basket, and thus reduces the production cost of the opening and closing mechanism.

According to the present disclosure, the angle between the rotary rod and the transmission rod is an obtuse angle, so that with the rotation trend of the rotary rod and the transmission rod, the limit block and the position block can be squeezed more densely when the door body is squeezed by ice cubes. Therefore, the door body is not prone to rotation.

The position member according to the present disclosure is a travel switch configured for controlling the motor for opening and closing, and the shutdown of the motor for opening and closing is controlled according to the abutment degree of the rotary block against the elastic abutment sheet.

To sum up, the disclosure includes at least one of the following beneficial technical effects:

1. When cold water is needed, water from the water source enters the ice-making box, and after being cooled by the evaporator, enters the ice storage basket and flows into the cold water tank, so as to realize the preparation of the cold water while saving resources and reducing the resource wastes.
2. Because of the partition, cold water is not easy to contact with ice cubes, so that the ice cubes are not easy to stick.
3. The passage allows the iced water generated by melting part of the ice to enter the chamber on the side of the partition close to the ground, so as to facilitate the collection of the iced water.

DETAILED DESCRIPTION

The disclosure will be further described in detail below in combination with FIGS. 1-8.

Figure 1:
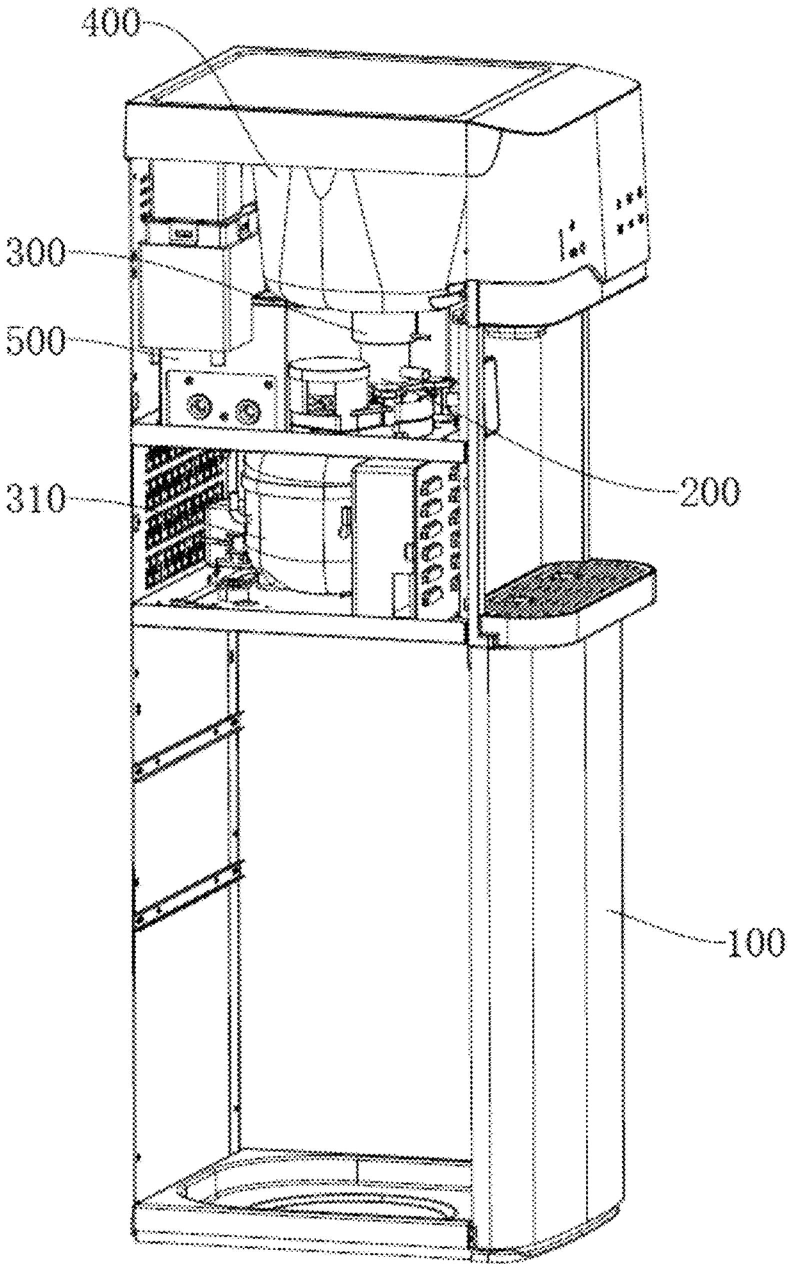
FIG. 1 is a schematic diagram of a general structure of Embodiment 1 of the disclosure.

The embodiment of the disclosure discloses a mechanism for making ice and cold water. Referring to FIG. 1, the mechanism for making ice and cold water includes an ice-making box 200, an evaporator 300, an ice storage basket 400 for storing ice cubes, and a cold water tank 500 for storing cold water.

The mechanism for making ice and cold water is installed in the machine body 100, and the machine body 100 is placed on the ground. The evaporator 300 is fixedly connected to the machine body 100, and the evaporator 300 is configured to be connected to the compressor 310, to perform a temperature control on water. The structures of the evaporator 300 and the compressor 310 are consistent with that of the existing technologies.

Figure 2:
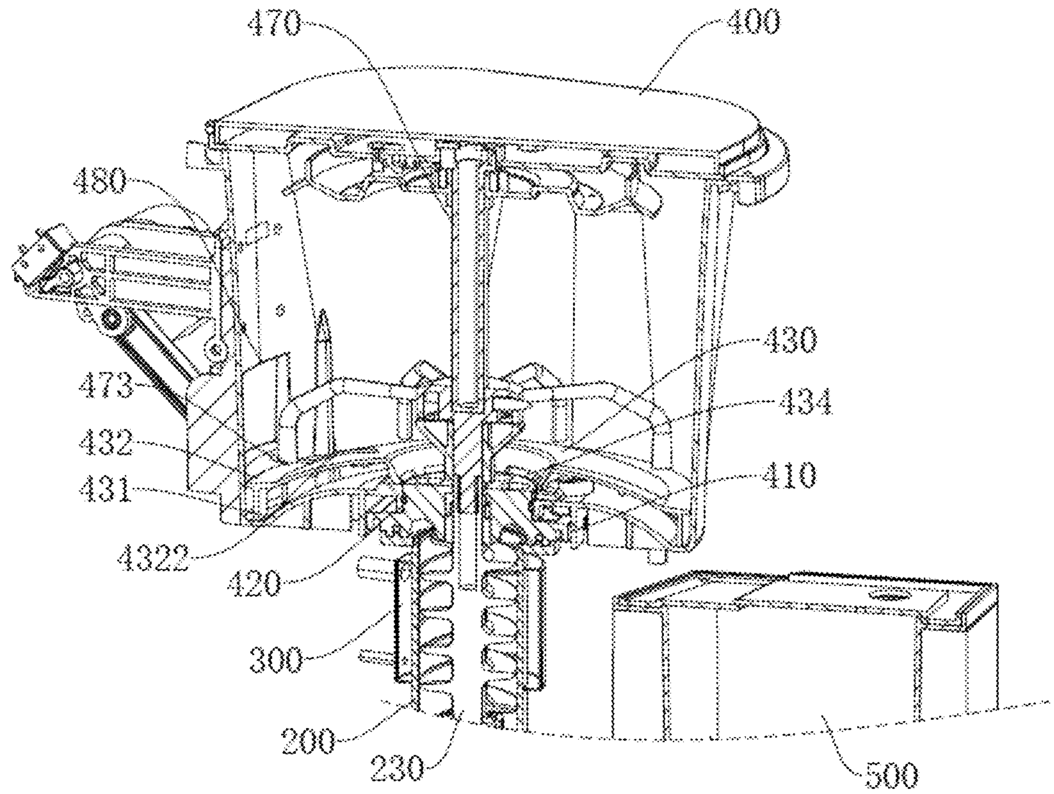
FIG. 2 is a sectional view of an ice storage basket in Embodiment 1 of the disclosure.
Figure 3:
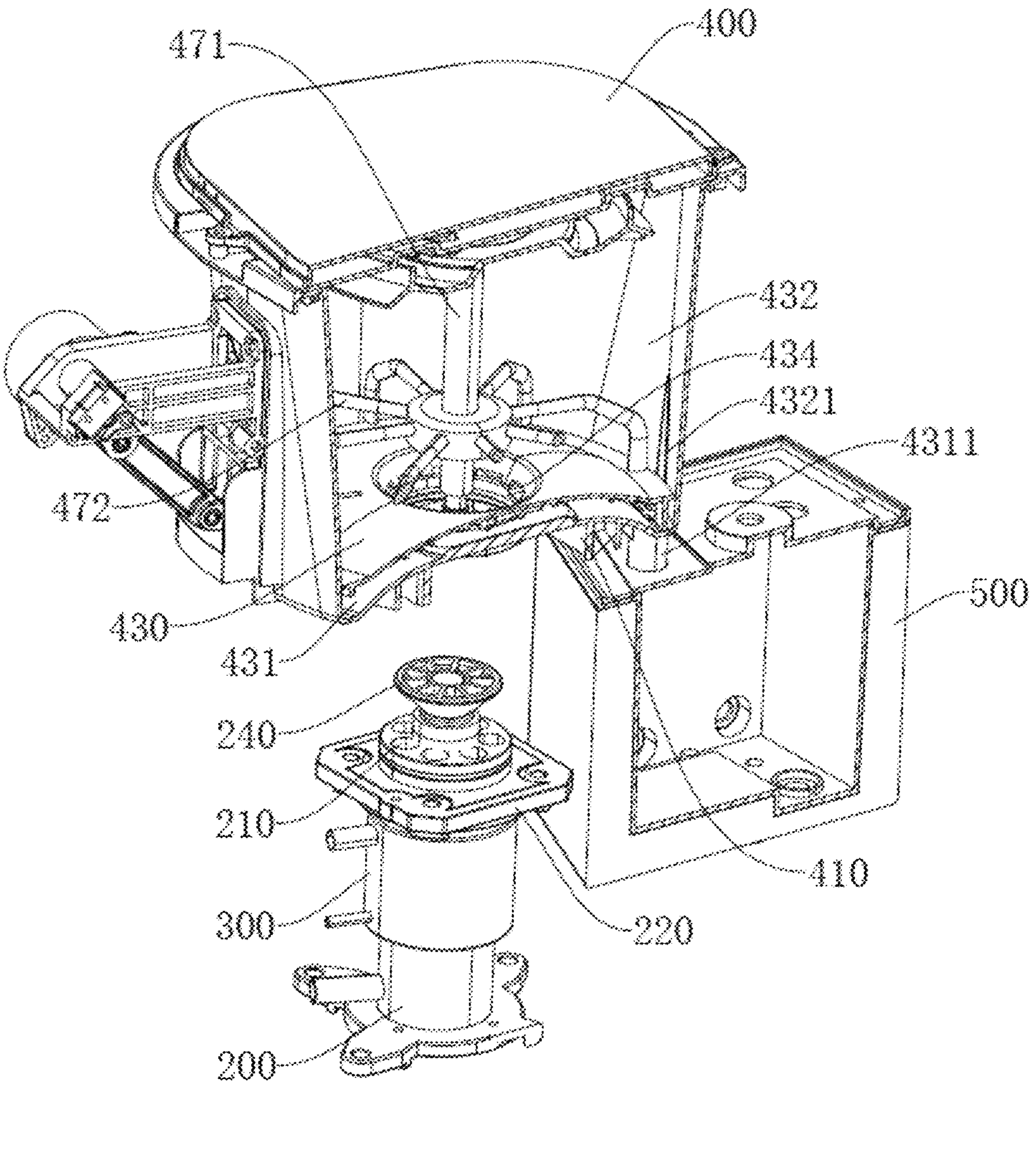
FIG. 3 is an exploded diagram of the ice storage basket and an ice-making box in Embodiment 1 of the disclosure.

Referring to FIG. 2 and FIG. 3, the ice-making box 200 is fixedly connected to the machine body 100. The ice-making box 200 in this embodiment is an extrusion type ice maker. The ice-making box 200 is cylindrical. The ice storage basket 400 is configured with a passageway 420. The side of the ice-making box 200 away from the ground passes through the passageway 420 into the ice storage basket 400 and is connected to the ice storage basket 400, so that a plurality of ice-making holes 210 are in communication with the ice storage basket 400, so as to transport the ice cubes produced by the ice-making box 200 to the ice storage basket 400 for storage through the rising screw. The evaporator 300 is arranged in an axial direction of the ice-making box 200 to cool the water in the ice-making box 200.

In the present disclosure, specifically, the ice-making box 200 is connected with the ice storage basket 400 in such a way, that a position plate 220 is fixedly connected on the outer wall of the ice-making box 200, and the position plate 220 is configured as a polygon, in the present embodiment, the position plate 220 is a quadrilateral. The ice storage basket 400 is configured with a position socket 410 engaged with the position plate 220, and the position socket 410 is in communication with the passageway 420.

The ice-making box 200 is connected with a water source and is configured as a closed box body. A plurality of ice-making holes 210 are defined on the end wall of the ice-making box 200 away from the ground. When ice cubes in the ice-making box 200 pass through the ice-making holes 210, cylindrical ice cubes are generated.

In order to transfer the ice cubes out of the ice-making box 200, the machine body 100 is provided with a push assembly 230 configured for pushing the ice cubes out of the ice-making box 200. The push assembly 230 is a conventional technical solution in the art and will not be described in detail in this embodiment.

In other embodiments, the ice-making box 200 is a cylinder. The ice-making hole 210 is a channel along the axial direction of the ice-making box 200, a plurality of ice-making holes 210 are evenly distributed in the circumferential direction of the ice-making box 200, and adjacent ice-making holes 210 are in communication with each other. The bottom of the ice-making box 200 is connected with a water source, the water source is a water storage tank in the machine body that stores water at room temperature.

The push assembly 230 includes a pusher motor and a pusher screw coaxially connected to the pusher motor. The pusher motor is vertically arranged at the bottom of the ice-making box 200. In other embodiments, the push assembly 230 may be any assembly that can realize lifting.

After the water in the ice-making holes 210 freezes into ice, the pusher motor is started to drive the pusher screw to rotate, and the water or ice cubes in the ice-making box 200 are transported upward out of the ice-making holes by means of the pusher screw. In particular, the top of the ice-making box 200 is also provided with an ice breaker 240 configured to abut against ice cubes. The ice cubes are transported vertically upward and abut against the ice breaker 240, where they are broken into cylindrical ice cubes.

Referring to FIG. 2 and FIG. 3, the ice storage basket 400 is located above the cold water tank 500. Since ice cubes are easily adhered to each other after contacting with water, a partition 430 is provided in the ice storage basket 400, and the passageway 420 passes through the partition. A plurality of support ribs are fixedly connected to a side of the partition 430 facing the ground, so that the partition 430 divides the ice storage basket 400 into two chambers in the height direction. The chamber away from the ground is an ice storage chamber 432, and the chamber close to the ground is a cold water chamber 431. The bottom of the ice storage basket 400 has a cold water delivery pipe 4311 inserted in the cold water tank 500. The cold water chamber 431 is in communication with the cold water tank 500 via the cold water delivery pipe 4311.

The partition 430 is sleeved on a section of the ice-making box 200 extending in the ice storage basket 400. A through hole 434, through which iced water flows into the cold water chamber 431, is defined on the partition 430, so that after the water is converted into iced water through the ice-making box 200, it can directly flow into the cold water chamber 431 through the through hole 434 and enter the cold water tank 500 through the cold water delivery pipe 4311 for storage.

In order to prevent iced water from being easily retained in the cold water chamber 431, the bottom wall of the ice storage basket 400, that is, the bottom wall of the cold water chamber 431, gradually tilts downward from the passageway 420 toward the inner wall of the ice storage basket 400, so that the cold water delivery pipe 4311 on the ice storage basket 400 is located at the lowest point of the bottom wall of the ice storage basket 400.

When the ice cubes in the ice storage chamber 432 are retained for a long time, the ice cubes will melt and water is generated. If the water remains in the ice storage chamber 432, it will promote the melting of other ice cubes on the one hand, and will cause the ice cubes to stick together on the other hand, which affects the subsequent removal of the ice cubes. In order to discharge the water in the ice storage chamber 432 in time, the inner wall of the ice storage basket 400 is recessed outward to form a passage 4321, and the bottom wall of the ice storage chamber 432 gradually tilts downward from the passageway 420 toward the inner wall of the ice storage basket 400, so as to accelerate the flow of water from the side gap to the cold water chamber 431. The passage 4321 connects the ice storage chamber 432 and the cold water chamber 431, and the passage 4321 is arranged corresponding to the cold water delivery pipe 4311.

Based on the above-mentioned mechanism for making ice and cold water, this embodiment further proposes a water dispenser including the above-mentioned mechanism for making ice and cold water.

In order to facilitate the users to take out the ice cubes in the ice storage basket 400, a pusher dog 470 is rotatably connected to the machine body 100. The pusher dog 470 includes a vertically arranged rotary shaft 471 and shifter levers 472 at the end of the rotary shaft 471 which are spaced apart from each other in the circumferential direction. A first end of the rotary shaft 471 is connected to the top of the ice storage basket 400 via a bearing, and a second end of the rotary shaft 471 is inserted in the ice breaker 240 and is in threaded engagement with the pusher screw.

The shifter levers 472 extend into the ice storage basket 400 to stir the ice cubes in the ice storage basket 400. A clearance 473 is available between the shifter levers 472 and the bottom wall of the ice storage chamber 432, so that the shifter levers 472 are unlikely to rub against the bottom wall. An ice outlet 480 is defined on the side wall of the ice storage basket 400, and a limit bar 4322 configured for limiting the rotation of ice cubes is integrally formed on one side of the ice outlet 480. The limit bar 4322 radially extends toward the axis of the passageway 420 to improve the output efficiency of the ice cubes from the ice outlet 480.

Figure 4:
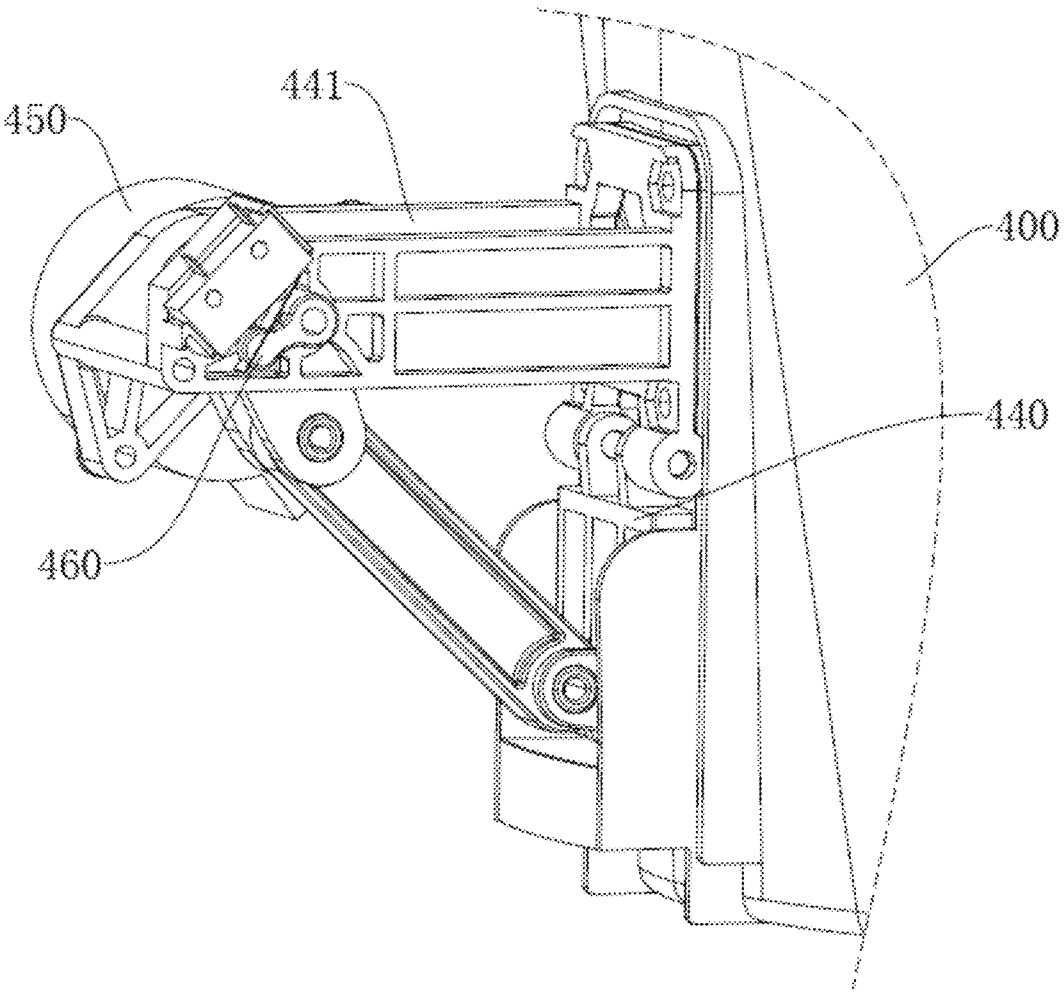
FIG. 4 is a schematic structural view of an opening and closing mechanism in Embodiment 1 of the disclosure in a closed state.
Figure 5:
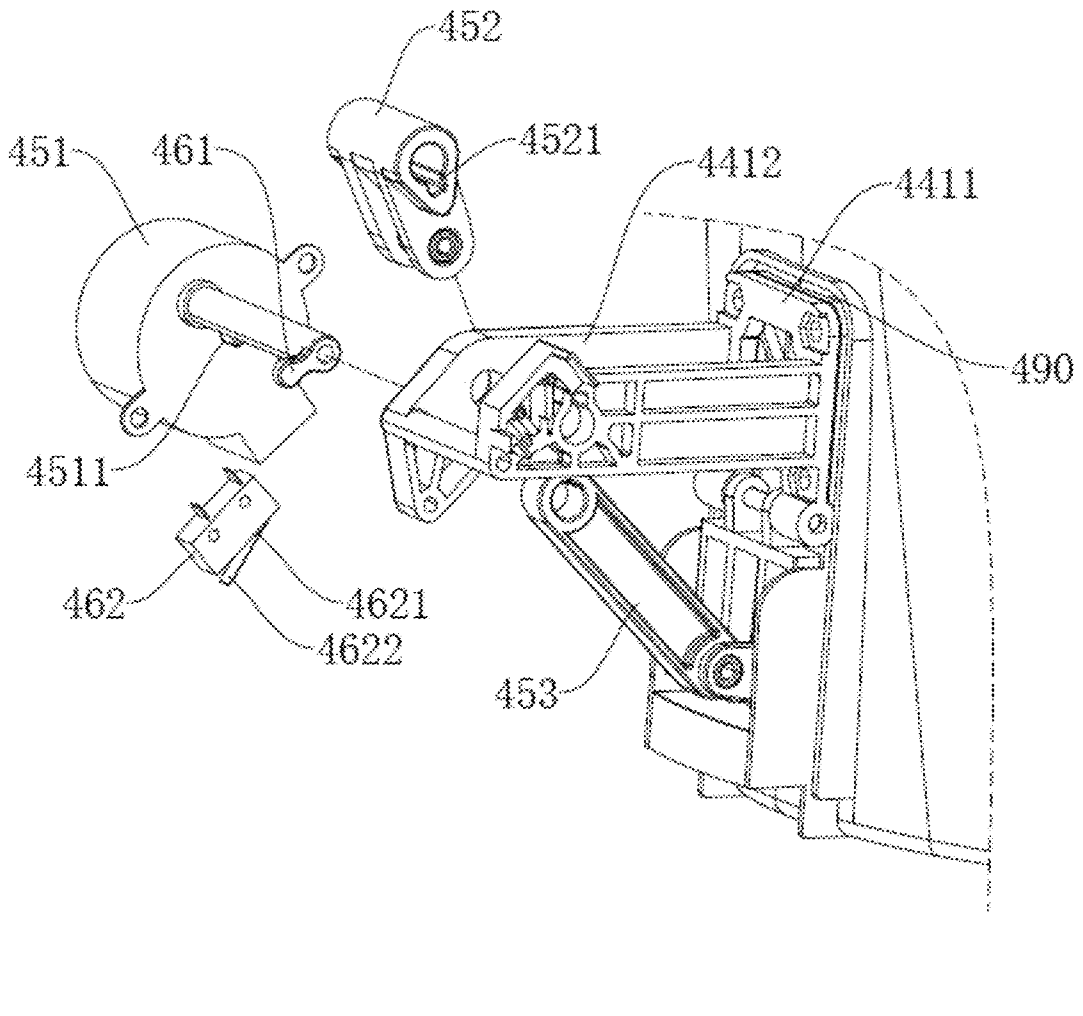
FIG. 5 is an exploded diagram of the opening and closing mechanism in Embodiment 1 of the disclosure.

Referring to FIG. 4 and FIG. 5, the ice storage basket 400 is rotationally connected with a door body 440 configured for covering the ice outlet 480 and an opening and closing mechanism configured for controlling the opening and closing of the door body 440. A bracket 441 for the opening and closing mechanism is provided outside the ice storage basket 400. The opening and closing mechanism includes a rotary assembly 450 and a limit assembly 460.

The rotary assembly 450 includes a motor for opening and closing 451, a rotary rod 452 and a transmission rod 453. The motor for opening and closing 451 is horizontally fixed to the bracket 441. A first end of the rotary rod 452 is fixed to the output shaft of the motor for opening and closing 451, and a second end thereof is rotatably connected to a first end of the transmission rod 453. The rotary rod 452 and the motor for opening and closing 451 are fixed in such a way, that the rotary rod 452 is sleeved on the output shaft of the motor for opening and closing 451, the output shaft of the motor for opening and closing 451 is provided with a plurality of fixing blocks 4511 at intervals along the axis, and the rotary rod 452 is configured with insertion sockets 4521 adapted to the fixing blocks 4511. In other embodiments, the motor for opening and closing 451 can be replaced by any structure that can drive the rotary rod 452 to rotate.

A second end of the transmission rod 453 is rotatably connected to a side of the door body 440 away from the ice storage basket 400. The top of the door body 440 is rotatably connected to the bracket 441.

The bracket 441 includes a connection plate 4411 and support plates 4412 on two sides of the connection plate 4411. The connection plate 4411 and the support plates 4412 are integrally formed. The connection plate 4411 is fixed on the ice storage basket 400 by bolts, and the outer wall of the ice storage basket 400 has an accommodation groove 490 for the connection plate 4411, and the accommodation groove 490 is corresponding to the ice outlet 480.

The limit assembly 460 includes a rotary block 461 and a position member 462. The rotary block 461 is fixed on the end of the output shaft of the motor for opening and closing 451. The rotary block 461 is in the shape of a bar and extends radially in the axis of the rotary rod 452. The position member 462 is fixedly mounted on a first one of the support plates 4412, and the motor for opening and closing 451 is bolted to a second one of the support plates 4412.

The position member 462 is located on the rotation track of the rotary block 461, and in the direction, in which the ice cubes press the door body 440 to open the door body 440, the position member 462 is located on a side of the rotary block 461 away from the ice storage basket 400. When the door body 440 is closed, the rotary block 461 abuts against the position member 462, and the angle between the rotary rod 452 and the side of the transmission rod 453 away from the ground is an obtuse angle, so that the rotary rod 452 tends to rotate toward the position member 462 when ice presses the door body 440, so that the door body 440 is not easily opened.

Specifically, the position member 462 is a travel switch, and a side thereof facing the rotary block 461 is provided with a start button 4621 and an elastic abutment sheet 4622 pressed on the surface of the start button 4621. When the rotary block 461 abuts against the elastic abutment sheet 4622, and drives the elastic abutment sheet to press the start button 4621 into the position member 462, the position member 462 can control the motor for opening and closing 451 to stop rotating, so as to complete the closing operation of the door body 440.

Based on the above-mentioned mechanism for making ice and cold water, this embodiment further proposes a water dispenser, which includes the above-mentioned mechanism for making ice and cold water.

The implementation principle of the mechanism for making ice and cold water of this embodiment of the present application is as follows. When it is required to make ice, water at the water source enters the ice-making box 200, the evaporator 300 cools the water in the ice-making box 200 to generate ice cubes. At this time, the pusher motor 111 is started to push the ice cubes in the ice-making box 200 into the ice storage basket 400. When it is necessary to generate cold water, water at the water source enters the ice-making box 200, the evaporator 300 cools the water, and the water directly flows into the cold water chamber 431 through the through hole 434 and finally enters the cold water tank 500 for storage.

Embodiment 2

Compared with Embodiment 1, in this embodiment, a guide mechanism for guiding the ice cubes to flow out is provided in the ice storage basket, and the other structures are consistent with those of Embodiment 1.

Figure 6:
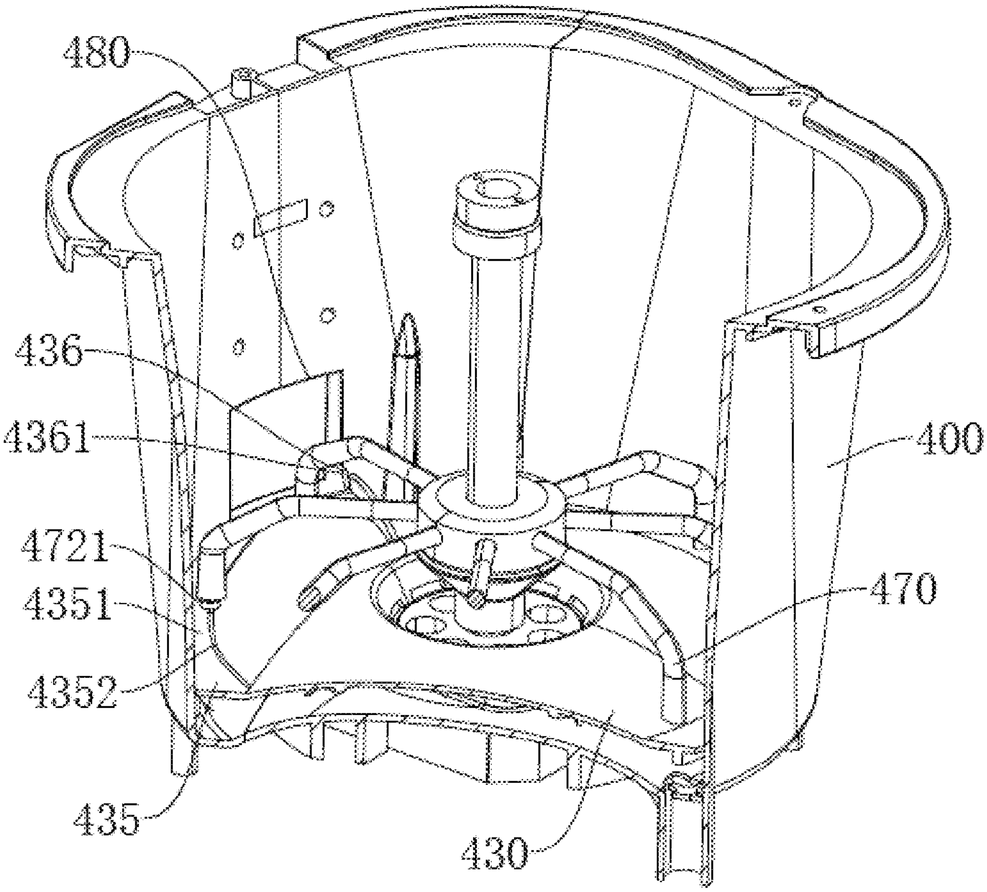
FIG. 6 is a schematic structural view of a guide plate in Embodiment 2 of the disclosure.

Referring to FIG. 6, the guide mechanism includes a guide plate 435 disposed on the top surface of the partition 430 and a pusher dog 470. The guide plate 435 is an arc-shaped plate, and a top thereof has a guide arc surface 4351 for guiding ice cubes to the ice outlet 480. The guide arc surface 4351 gradually inclines from the side away from the ice outlet 480 toward the bottom wall of the ice outlet 480, and one side of the guide plate 435 is flush with the bottom wall of the ice outlet 480, so that the pusher dog 470 can push the ice cubes out of the ice storage basket 400 along the guide arc surface 4351 when rotating.

In particular, the shifter lever 472 of the pusher dog 470 is provided with a push block 4721 at the end thereof facing the partition 430 which can lift and lower. The push block 4721 is extendable in the vertical direction by an elastic member. In this embodiment, the elastic member is a spring. When the pusher dog 470 rotates to the guide plate 435, the shifter lever 472 can always abut against the guide plate 435 and be restored to be above the partition 430 after leaving the guide arc surface 4351.

In order to improve the rotation effect of the shifter lever 472 on the guide plate 435, a pulley is rotatably mounted on the bottom of the push block 4721. The guide arc surface 4351 has a groove for pulley 4352 slidably engaged with the shifter lever 472 along the rotation direction of the shifter lever.

Figure 7:
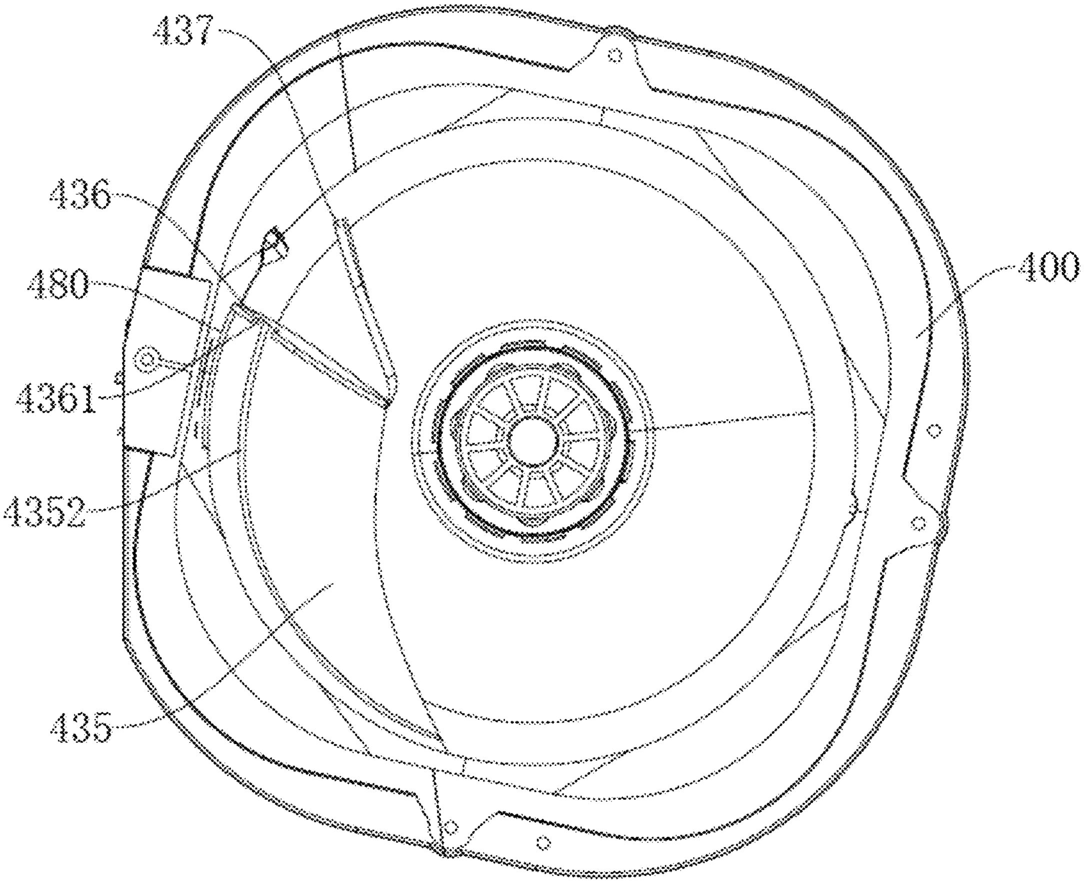
FIG. 7 is a schematic top view of the guide plate in Embodiment 2 of the disclosure.

Referring to FIG. 6 and FIG. 7, a first baffle 436 is integrally formed on one side of the guide plate 435 close to the ice outlet 480 to block the ice cubes, to ensure that the ice cubes can be directly output from the ice outlet 480. In particular, the first baffle 436 is configured with a notch 4361 for the push block 4721 to pass through. The guide plate 435 is integrally provided with a second baffle 437 in a side close to the through hole 434. The second baffle 437 extends in the radial direction, and there is a separation between the second baffle and the inner wall of the ice storage basket 400 for the push block 4721 to slide. The second baffle 437 is corresponding to the ice outlet 480 and is configured to guide the extruded ice cubes to a side away from the first baffle 436, and then the pusher dog 470 is driven to push the ice cubes to the top of the guide plate 435.

Embodiment 3

Figure 8:
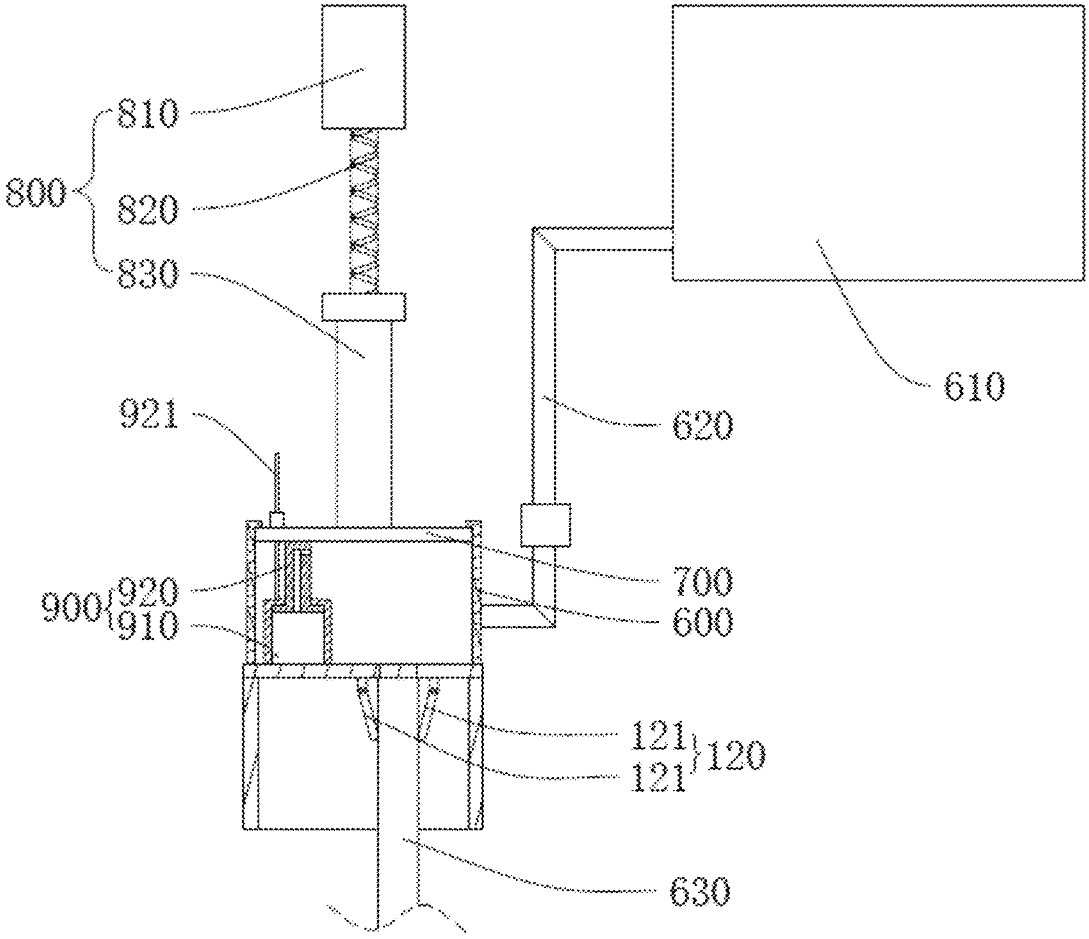
FIG. 8 is a partial sectional view of a water storage tank and a quantitative water tank in Embodiment 3 of the disclosure.

The difference between this embodiment and Embodiment 1 is that: referring to FIG. 8, the mechanism for making ice and cold water in this embodiment further includes a quantitative water tank 600 and a water storage tank 610. The remaining structures are consistent with those in Embodiment 1.

The quantitative water tank 600 is in communication with the ice-making box 200 via a second connection pipe 630. A quantitative piston 700 is arranged in the quantitative water tank 600, and the quantitative piston 700 is hermetically and slidably connected to the inner wall of the quantitative water tank 600. A first one-way valve is provided on the quantitative piston 700, so that the gas or liquid can only flow from the side of the quantitative piston 700 away from the bottom of the quantitative water tank 600 to the side of the bottom of the quantitative water tank 600. The quantitative water tank 600 is in communication with the water storage tank 610 through the connection pipe 620, so that the water in the water storage tank 610 flows into the quantitative water tank 600 when the quantitative piston 700 moves away from the bottom of the quantitative water tank 600. In order to prevent the liquid in the quantitative water tank 600 from easily flowing back into the water storage tank 610, a fourth one-way valve is provided on the connection pipe 620 to allow the water in the water storage tank 610 to flow into the quantitative water tank 600 in one direction. The water storage tank 610 is a room temperature water tank in the ice machine.

When the water in the quantitative water tank 600 enters the ice-making box 200 through the second connection pipe 630, some water will remain in the second connection pipe 630. Therefore, when the water in the ice-making box 200 freezes, the water in the second connection pipe 630 may also freeze, which affects the use of the second connection pipe 630. Based on this, an aeration assembly 900 is provided in the quantitative water tank 600. The aeration assembly 900 includes an aeration cylinder 910 and an aeration piston 920. The aeration cylinder 910 is located in the quantitative water tank 600 and fixedly connected to the bottom wall of the quantitative water tank 600. The aeration piston 920 is hermetically and slidably connected to the aeration cylinder 910, and the aeration piston 920 is fixed on a side of the quantitative piston 700 close to the bottom of the quantitative water tank 600. The aeration piston 920 and the quantitative piston 700 are both configured to be cylindrical, and their axes are spaced apart.

The aeration piston 920 is provided with a communicating pipe 921. A first end of the communicating pipe 921 is connected to the aeration cylinder 910, and a second end of the communicating pipe 921 protrudes out of the quantitative water tank 600 and is connected to a filter assembly. In this embodiment, the filter assembly may be a filter element, so that the filter assembly can filter the gas sucked into the communicating pipe 921. The aeration piston 920 is provided with a second one-way valve in communication with the outside of the quantitative water tank 600, so that the external air can enter the aeration cylinder 910 in one direction. A third one-way valve is provided on the side wall of the aeration piston 920 to connect the quantitative water tank 600 and the aeration cylinder 910 and allow the air in the aeration cylinder 910 to enter the quantitative water tank 600 in one direction.

When the quantitative piston 700 moves in a direction away from the bottom of the quantitative water tank 600, the water in the water storage tank 610 is continuously infused into the quantitative water tank 600. At the same time, the aeration piston 920 moves with the quantitative piston 700, so that the external air continuously enters the aeration cylinder 910, so as to complete the replenishment of the air in the aeration cylinder 910 and the replenishment of the water in the quantitative water tank 600. When the quantitative piston 700 moves in a direction close to the bottom of the quantitative water tank 600, the water in the quantitative water tank 600 gradually flows into the ice-making box 200. At the same time, the aeration piston 920 moves toward the bottom of the aeration cylinder 910 with the quantitative piston 700, so that air in the aeration cylinder 910 is discharged and enters the quantitative water tank 600 through the third one-way valve. When all the water in the quantitative water tank 600 enters the ice-making box 200 and the second connection pipe 630, the continuous movement of the quantitative piston 700 will cause the air in the quantitative water tank 600 to enter the second connection pipe 630, so that all the water in the second connection pipe 630 enters the ice-making box 200, so that the second connection pipe 630 is not easily damaged by frozen water.

The machine body 100 is provided with a drive assembly 800 configured for sliding the quantitative piston 700. The drive assembly 800 includes a drive motor 810, a drive screw 820 and a drive sleeve 830. The drive motor 810 is fixedly connected to the machine body 100. The output shaft of the drive motor 810 is coaxially and fixedly connected to the drive screw 820, and the drive screw 820 extends along the sliding direction of the quantitative piston 700. The drive screw 820 is a bidirectional screw. The drive sleeve 830 is fixedly connected to the slider of the drive screw 820 and is connected to the side of the quantitative piston 700 away from the bottom of the quantitative water tank 600, so that the drive screw 820 rotates after the drive motor 810 is started, and the slider of the drive screw 820 can drive the drive sleeve 830 to move close to or away from the ground.

In order to push the water in the second connection pipe 630 into the ice-making box 200 by air smoothly, a limit clamp 120 is provided on the machine body 100. The limit clamp 120 includes two clamp plates 121. Both clamp plates 121 are rotatably connected to the machine body 100 and are respectively arranged on two sides of the second connection pipe 630. A clamp assembly configured for driving the two clamp plates 121 to clamp the second connection pipe is provided on the machine body 100, and the clamp assembly includes a plurality of torsion springs. In the present embodiment, two torsion springs are provided, a first end of a first one of the torsion springs is fixedly connected to a first one of the clamp plates 121, and a second end of the first one of the torsion springs is fixedly connected to the machine body 100, and a first end of the second one of the torsion springs is fixedly connected to a second one of the clamp plates 121, and a second end of the second one of the torsion springs is fixedly connected to the machine body 100. Under the elastic force of the torsion springs, the two clamp plates 121 clamp the second connection pipe 630 to prevent air from easily overflowing. When the aeration piston draws water from the water storage tank, the clamp plates clamp the second connection pipe, so that the quantitative water tank is in a sealed chamber. When the aeration piston moves toward the second connection pipe, the clamp plates release the second connection pipe under pressure, and water flows from the quantitative water tank to the ice-making box 200.

The above are all preferred embodiments of the application, and do not limit the protection scope of the application. Therefore, any equivalent changes made based on the structure, shape, and principle of the application shall be covered by the protection scope of the application.

LIST OF REFERENCE NUMERALS

100 machine body
120 limit clamp
121 clamp plate
200 ice-making box
210 ice-making hole
220 position plate
230 push assembly
240 ice breaker
300 evaporator
310 compressor
400 ice storage basket
410 position socket
420 passageway
430 partition
431 cold water chamber
4311 cold water delivery pipe
432 ice storage chamber
4321 passage
4322 limit bar
434 through hole
435 guide plate
4351 guide arc surface
4352 groove for pulley
436 first baffle

4361 notch
437 second baffle
440 door body
441 bracket
4411 connection plate
4412 support plate
450 rotary assembly
451 motor for opening and closing
4511 fixing block
452 rotary rod
4521 insertion socket
453 transmission rod
460 limit assembly
461 rotary block
462 position member
4621 start button
4622 elastic abutment sheet
470 pusher dog
471 rotary shaft
472 shifter lever
4721 push block
473 clearance
480 ice outlet
490 accommodation groove
500 cold water tank
600 quantitative water tank
610 water storage tank
620 first connection pipe
630 second connection pipe
700 quantitative piston
800 drive assembly
810 drive motor
820 drive screw
830 drive sleeve
900 aeration assembly
910 aeration cylinder
920. aeration piston
921 communicating pipe

What is claimed is:

1. A water dispenser comprising an ice-making mechanism, wherein:

the ice-making mechanism comprises:

an ice-making box configured to make ice cubes, wherein the ice-making box is in communication with a water source, so that the water source supplies water to the ice-making box, an evaporator sleeved on the ice-making box, wherein the evaporator is configured to cool the water in the ice-making box to make the ice cubes, an ice storage basket configured for storing the ice cubes, wherein the ice storage basket is located on a side of the ice-making box away from ground and is in communication with the ice-making box, and a cold water tank configured for storing cold water, wherein the cold water tank is in communication with the ice storage basket, the ice-making mechanism is further configured to make the cold water, a pusher dog configured for pushing the ice cubes is rotatably arranged in the ice storage basket, a partition is provided in the ice storage basket, the partition divides the ice storage basket into a cold water chamber and an ice storage chamber, an inner wall of the ice storage basket is recessed outward to form a passage, the passage connects the ice storage chamber and the cold water chamber, the ice storage basket is configured with an ice outlet on a side of the ice storage basket away from the passage, and the ice storage basket is provided with a door body configured for covering the ice outlet and an opening and closing mechanism configured for controlling opening and closing of the door body, a bottom of the ice storage basket is configured with a passageway in communication with the ice-making box, and the passageway passes through the partition, a clearance is configured between the pusher dog and a bottom of the ice storage chamber, the bottom of the ice storage chamber is provided with a limit bar configured for limiting a rotation of the ice cubes at the ice outlet, and the limit bar radially extends toward the passageway, the opening and closing mechanism comprises a rotary assembly and a limit assembly, the rotary assembly comprises a motor for opening and closing, a rotary rod and a transmission rod, a first end of the rotary rod is vertically fixed to an output shaft of the motor for opening and closing, a second end of the rotary rod is rotatably connected to a first end of the transmission rod, and a second end of the transmission rod is rotatably connected to the door body, and the limit assembly comprises a rotary block at an end of the output shaft of the motor for opening and closing and a position member configured for limiting a rotation of the rotary block, the position member is located on a side of an axis of the rotary rod away from the door body, and when the door body is closed, the position member abuts against the rotary block.

2. The ice-making mechanism according to claim 1, wherein the partition is configured with a through hole, iced water flows into the cold water chamber through the through hole, a size of the through hole is smaller than a size of any one of the ice cubes, and the cold water chamber is in communication with the cold water tank.

3. The ice-making mechanism according to claim 2, wherein a top surface of the partition tilts downward from the passageway toward the inner wall of the ice storage basket.

4. The ice-making mechanism according to claim 2, wherein a bottom wall of the ice storage basket tilts downward from the passageway toward the inner wall of the ice storage basket.

5. The ice-making mechanism according to claim 1, wherein a position plate is provided on an outer wall of the ice-making box, and the ice storage basket is configured with a position socket configured to be engaged with the position plate.

6. The ice-making mechanism according to claim 1, wherein the cold water tank is arranged in a circumferential direction of the evaporator and is located below the ice storage basket to support the ice storage basket.

7. The ice-making mechanism according to claim 1, wherein a cold water delivery pipe is provided at the bottom of the ice storage basket, a first end of the cold water delivery pipe is inserted in the cold water tank, and a second end of the cold water delivery pipe is in communication with the cold water chamber.

8. The ice-making mechanism according to claim 7, wherein the passage is arranged corresponding to the cold water delivery pipe.

9. The water dispenser according to claim 1, wherein the ice storage basket is provided with a bracket configured for mounting the rotary assembly and the limit assembly, the bracket comprises a connection plate and support plates on two sides of the connection plate, a side of the door body away from the ground is rotatably connected to the support plates, the motor for opening and closing is fixed to a first support plate of the support plates, and the position member is fixed to a second support plate of the support plates.

10. The water dispenser according to claim 9, wherein the position member is a travel switch, the position member is provided with an elastic abutment sheet configured to abut against the rotary block, a side of the elastic abutment sheet away from the rotary block abuts against a start button of the travel switch, and when the rotary block rotates to press against the elastic abutment sheet and the start button is completely pressed in the position member, and the position member stops the motor for opening and closing.

11. The water dispenser according to claim 1, wherein when the door body is closed, an angle between the rotary rod and a side of the transmission rod away from the ground is an obtuse angle.

* * * * *